United States Patent [19]
Rogalski

[11] 3,789,918
[45] Feb. 5, 1974

[54] WATER HEATING AND COOLING SYSTEM WITH HUMIDITY CONTROL MEANS

[76] Inventor: Frank Rogalski, 47900 Harbor Dr., New Baltimore, Mich. 48047

[22] Filed: Feb. 10, 1972

[21] Appl. No.: 225,127

Related U.S. Application Data

[63] Continuation-in-part of Ser. No. 31,696, April 24, 1970, abandoned.

[52] U.S. Cl. .................. 165/19, 165/60, 237/78
[51] Int. Cl. ............................................ F24f 3/14
[58] Field of Search ..... 165/19, 20, 110, 60, 50, 22; 237/78

[56] References Cited
UNITED STATES PATENTS
| | | | |
|---|---|---|---|
| 1,589,428 | 6/1926 | Rosenow | 237/78 |
| 1,760,633 | 5/1930 | Crawford | 237/78 |
| 1,970,234 | 8/1934 | Huff | 237/78 |
| 2,129,427 | 9/1938 | Jepertinger | 165/22 |

Primary Examiner—Charles Sukalo
Attorney, Agent, or Firm—Lon H. Romanski

[57] ABSTRACT

A system for heating a particular zone within a related structure, such as a dwelling, includes a water heating boiler and a water reservoir or humidifier sump. The boiler is supplied by the humidifier sump or water reservoir which also reclaims waste water from associated humidifier troughs and drip pans. The drip pans of the system define condensation collecting means for the system. Also included are a plurality of valves to control the heating and humidity, within the zone to be heated, as well as an emergency water supply for the boiler with a circulation pump provided for the heating and/or cooling.

3 Claims, 3 Drawing Figures

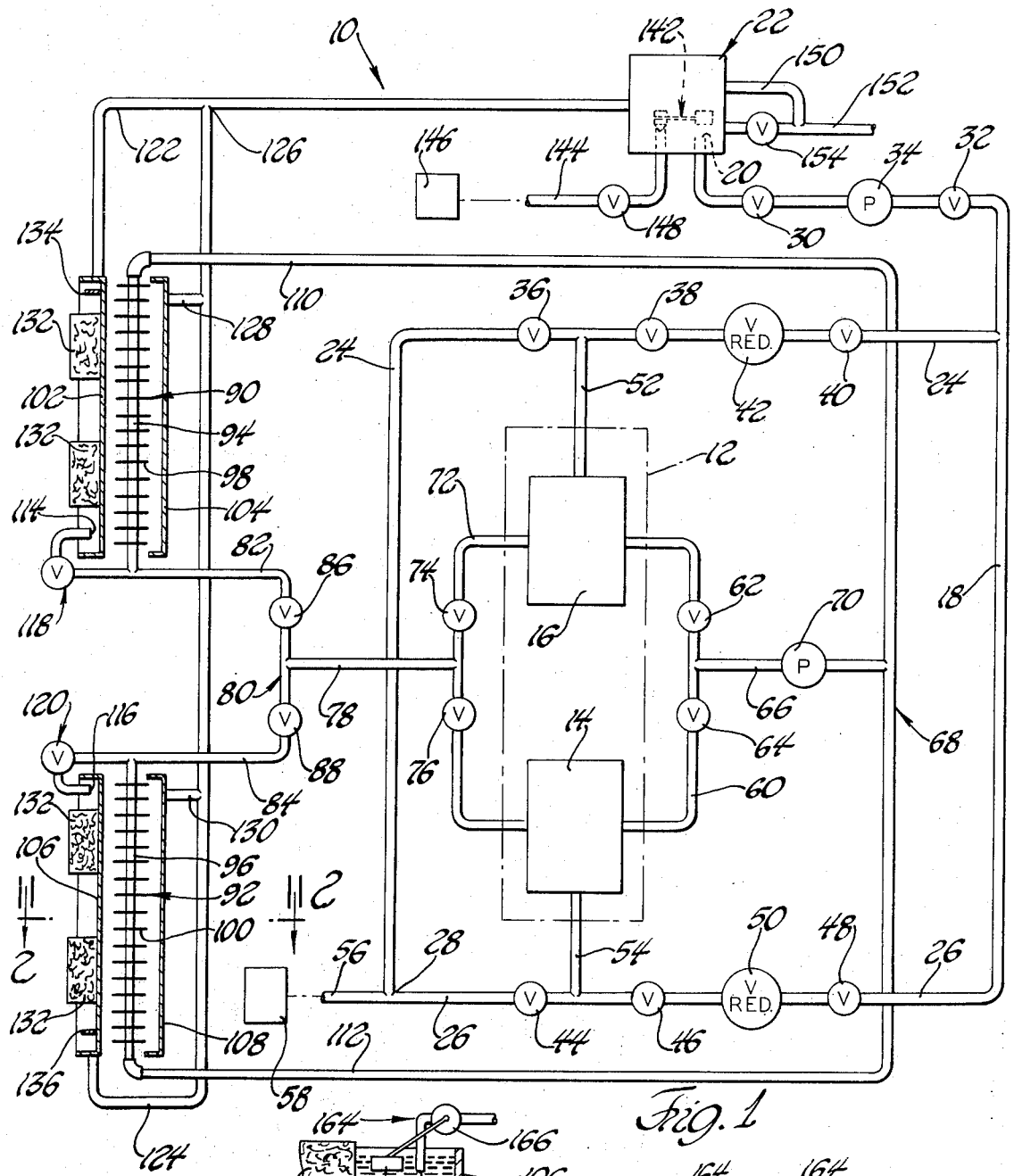
Fig.1
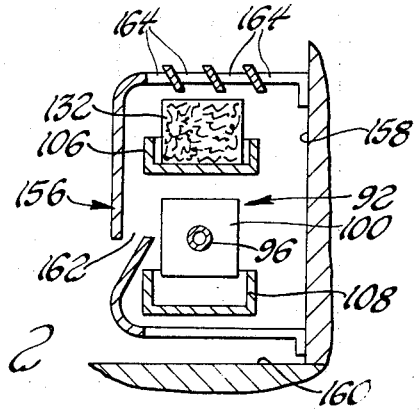
Fig.3
Fig.2

WATER HEATING AND COOLING SYSTEM WITH HUMIDITY CONTROL MEANS

RELATED APPLICATIONS

This application is a Continuation-in-Part of my co-pending application, Ser. No. 31,696 filed Apr. 24, 1970 and now abandoned.

BACKGROUND OF THE INVENTION

Heretofore, heating systems employing circulated heated water had a major undesirable characteristic. That is, such hot water heating systems, although effective for supplying heat to a particular zone to be heated, were ineffective for simultaneously providing means whereby that same heated zone was also properly humidified.

It is well known that during the heating season the ambient atmosphere is usually of a decidedly low relative humidity as well as being at a low temperature. For example, such atmosphere may be at 25°F. and 35 percent relative humidity. When such atmosphere is then heated to, for example 75°F. within the heated zone, the relative humidity of such heated air may drop to 5–10 percent.

Such low values of relative humidity in turn often create respiratory problems in humans occupying that heated zone as well as causing the destruction of furnishings therein by evaporation of moisture inherently contained within the structure of such furnishings.

The only way of overcoming the above created low relative humidity is by the introduction of additional moisture into the heated air of the heated zone. However, this, in the past, has not been readily attainable because of the fact that hot water heating systems employ a closed circuit for the hot water. Accordingly, the invention as herein disclosed and claimed is primarily directed to the solution of the above as well as other related problems.

SUMMARY OF THE INVENTION

According to the invention a hot water heating and humidity control system for controlling the temperature and humidity within a related zone comprises first means defining a water circulating circuit, second means forming a portion of said first means and defining radiator means situated generally within said zone, third means for heating water to be circulated through said circulating circuit and forming a portion of said first means, humidification trough means situated in relatively close proximity to said radiator means as to be influenced by the temperature of said radiator means, and water conduit means communicating generally between said circulating circuit and said trough means for supplying water to said trough means so as to be evaporated therefrom due to the temperature of said radiator means.

Various general and specific objects and advantages of the invention will become apparent when reference is made to the following description considered in conjunction with the accompanying drawings.

DESCRIPTION OF THE DRAWINGS

In the drawings wherein for purposes of clarity certain elements and/or details may be omitted from one or more views:

FIG. 1 is a diagrammatic representation of a heating system embodying the invention;

FIG. 2 is an enlarged cross-sectional view typically taken generally on the plane of line 2—2 of FIG. 1 and looking in the direction of the arrows; and FIG. 3 fragmentary illustrates a modification of the invention.

DESCRIPTION OF THE PREFERRED EMBODIMENT

Referring now in greater detail to the drawings, FIG. 1 illustrates the system 10 as being comprised of a boiler section 12 which, in turn, may be comprised of a water heating boiler unit 14 and a cooling boiler unit 16.

A main conduit 18, having an open end 20 in communication with the interior of an associated water reservoir 22, is in communication with branch conduit portions 24 and 26 which, in turn, may be connected to each other as at 28. As illustrated, main conduit 18 is provided with valves 30 and 32 with a pump 34 situated generally therebetween.

Branch conduit portion 24 is provided with shut-off valves 36, 38 and 40 along with a pressure reducing valve 42. Similarly, branch conduit portion 26 is provided with shut-off valves 44, 46 and 48 along with a pressure reducing valve 50. As illustrated, branch conduits 24 and 26 are respectively provided with conduit sections 52 and 54 communicating with boiler sections 16 and 14. Branch conduit, shown as broken-off as at 56, communicates with a suitable source of emergency water supply 58.

An additional conduit 60, having its opposite ends communicating with boilers 16 and 14, is provided with shut-off valves 62 and 64 and is further in communication with a conduit 66 which has a first end communicating with conduit means 68 and a second end communicating with conduit 60 at a point generally between valves 62 and 64. As shown, conduit 66 may be connected through a suitable circulating pump 70.

Similarly, a conduit 72, having its opposite ends communicating with boilers 16 and 14, is provided with shut-off valves 74 and 76 and is further in communication with one end of a conduit 78 which, in turn, has its other end communicating with a conduit section 80 provided with generally leg portions 82 and 84. As shown, conduit section 80 is provided with shut-off valves 86 and 88.

A plurality of heat radiator assemblies 90 and 92 are respectively comprised of water passage forming conduit sections 94 and 96 with transversely extending heat radiating fins 98 and 100 carried thereby.

A humidification water trough 102 is preferably situated above radiator 90 while a moisture drip pan 104 is likewise preferrably situated below the radiator assembly 90. Similarly, a humidification water trough 106 is preferably situated above radiator 92 while a corresponding drip pan 108 is preferrably located below radiator 92.

As can be seen, conduit section 94 of radiator assembly 90 has its opposite ends respectively communicating with conduit portion 82 and conduit section 110 forming generally a leg of conduit means 68. Similarly, conduit section 96 of radiator assembly 92 has its opposite ends respectively communicating with conduit portion 84 and conduit section 112 forming generally a second leg of conduit means 68.

The upper ends 114 and 116 of conduit portions 82 and 84 are adapted for the discharge of water into humidification troughs 102 and 106 respectively. As schematically depicted, in the preferred embodiment suitable valving means 118 and 120 are provided in conduit portions 82 and 84 generally near the open ends 114 and 116.

A first water return conduit 122 has one end communicating with the interior of humidification trough 102 while its other end is in communication with the interior of the water reservoir 22 thereby causing the water reservoir 22 to also function as a sump for excess humidification water. A second water return conduit 124 is illustrated as having one end in communication with the interior of humidification trough 106 while its other end communicates with conduit 122 as at 126. Additionally, return conduits 128 and 130 are provided for communicating between return conduit 124 and drip pans 104 and 108, respectively.

As somewhat diagrammatically illustrated troughs 102 and 106 are preferrably provided with generally water absorbent material 132 thereby being effective to maintain a more steady level of water in the troughs as well as possibly increasing the exposed area in order to thereby enhance the rate of evaporation if such be desired.

Further, as generally depicted, in the preferred embodiment suitable means are provided for preventing return flow of water out of the humidification troughs to the respective drain or return conduits. This is achieved as by the use of suitable transversely extending plates 134 and 136 serving as wiers or dams to the water supplied by the ends 114 and 116 of conduits 82 and 84. The height of such wiers would, of course, be somewhat less than the height (or depth) of the corresponding trough. Alternatively, ends 138 and 140 of conduits 122 and 124 may be connected to troughs 102 and 106 at a height, with respect to the bottom of such troughs, as to result in such height to function as a wier.

As somewhat schematically illustrated, the humidifier sump or water reservoir 22 is preferably provided with a float-controlled inlet valve assembly 142 for controlling the admission of water into the reservoir 22 from an associated main water supply conduit 144 which communicates with a suitable source 146 of water. As shown, the conduit 142 may include a main water shut-off valve 148.

Additionally, reservoir 22 may be provided with a safety gravity overflow conduit 150 which communicates with a gravity drain conduit 152 leading to suitable related drain means. A shut-off valve 154 may be provided whereby the reservoir 22 may be completely drained when necessary.

OPERATION OF INVENTION

Let it be assumed that the system as disclosed in FIG. 1 is to operate in the cooling mode. At this time it should be pointed out that the boiler unit 16 may, in fact, be what is often referred to as a "chiller" of a related refrigeration unit functioning to chill the water passing therethrough in order to thereby cool a particular area or zone serviced by the radiators 90 and 92.

In the cooling mode of operation, valves 118, 120, 76, 60, 44 and 48 may be closed thereby effectively isolating the heating boiler 14 while permitting operation of the chiller 16. Generally, during cooling operation, there is no problem of a low relative humidity. Therefore, valves 118 and 120 may be closed at this time. However, often during the process of cooling a particular zone, the humidity therein might become excessive. Such excessive humidity may be removed in the form of condensation formed on a structure of relatively low temperature.

Accordingly, as the pump 70 is energized water is circulated generally through the circuit described by conduits 66, 60, 72, 78, 80, 82, 84, 94, 110, 68 and 96, 112, 68. As the chilled water passes through the radiator assemblies 90 and 92, the temperature of the conduit sections 94 and 96 thereof as well as the fins 98 and 100 carried thereby is reduced. Such a reduction in temperature will, in turn, reduce the temperature of the air flowing past the radiators. If the temperature differential between the radiator assemblies 90, 92 and the air is sufficient with reference to the relative humidity of the air, condensation will occur on the radiator assemblies. Such condensation will eventually form free water which, in turn, by gravity will drop into the drip pans 104 and 106 from where such water condensate will return to the reservoir 22 via conduit sections 128 and 130 and conduits 124 and 122.

In the heating mode of operation, valves 62, 74, 36 and 40 will be closed thereby effectively isolating the chiller unit 16. When circulating pump 70 is energized, water will be circulated through the circuit generally described by conduit 66, valve 64, conduit 60, heating boiler 14, valve 76, conduits 72, 78, conduits 82, 84, radiators 90, 92, conduit portions 110, 112, and conduit means 68.

Further, water is also permitted to flow through valves 118, 120 and conduit outlets 114, 116 into humidification troughs 102 and 106, respectively. The height or level of the water within the troughs 102 and 106 may be regulated in the manner previously described as by the use of wiers 134 and 136 with any excess water being returned to drain as by conduits 122 and 124.

The heat emanating from the radiators, of course, serves to increase evaporation of the water in the troughs 102, 106 above such radiators thereby raising the relative humidity of the air within the heated zone.

Generally, pump 34 is employed to supply water to the overall system. However, since the output pressure of pump 34 may be excessive for use in the system, pressure reducing or regulating valves 42 and 50 are preferably employed in order to achieve a water pressure compatible to the overall system.

It should be apparent that suitable controls, such as humidistats, may be employed for sensing the value of the relative humidity within the heated zone and in accordance therewith open and close valving means 118 and 120 in order thereby maintain the desired degree of relative humidity.

FIG. 2 illustrates that the radiator assembly, as typically shown by 92, may be generally contained within an outer housing or grille assembly 156 which may be suitably secured as to a wall 158 of the related dwelling at some suitable distance above the floor 160 of such dwelling. The grille 156 may be provided with a plurality of air passages or apertures which may take the form of side vents 162 and upper louvered air ducts 164 thereby permitting the substantially unrestricted flow of air therethrough and about the radiator and humidification trough.

FIG. 3 illustrates a modification of the invention wherein the humidification trough, such as 106, may have the water level contained therein controlled by a float-operated valving assembly 164. The valving member 166 in circuit with, for example, conduit section 84 would be actuated from an open to a closed position as by a float member 168 operatively connected thereto and situated generally within the related humidification trough.

Although only one preferred embodiment of the invention has been disclosed and described, it is apparent that other embodiments and modifications of the invention are possible within the scope of the appended claims.

I claim:

1. A hot water heating and humidity control system for controlling the temperature and humidity within a related zone, comprising first means defining a water circulating circuit having water reservoir means, second means forming a portion of said first means and defining radiator means situated generally within said zone, third means comprising water heating means for heating water supplied by said water reservoir means to be circulated through said circulating circuit and forming a portion of said first means, pump means for pumping water through said water circulating circuit, trough means situated in relatively close proximity to said radiator means, said trough means comprising first and second troughs situated generally at opposite sides of but spaced from said radiator means as to have said first trough generally above said radiator means and said second trough generally below said radiator means, first water conduit means communicating generally between said water circulating circuit and said first trough for supplying water to said first trough so as to be evaporated therefrom due to the relatively higher temperature of said radiator means caused by said heated water being circulated therethrough by said pump means, second water conduit means communicating between said first trough and said water reservoir means for returning any excessive water from said first trough to said water reservoir means, and third water conduit means communicating between said second trough and said water reservoir means for returning any free water which may have accumulated within said second trough from condensate formed on said radiator means during such periods as when said radiator means is at a temperature less than the atmosphere within said zone as may occur when said pump means continues to circulate water through said water circulating circuit but said third means has not heated said water being circulated.

2. A hot water heating and humidity control system according to claim 1, wherein said first trough includes a bottom wall and upwardly extending generally opposed side walls, and further comprising a transversely extending wall within said first trough, said transversely extending wall being in sealing engagement with said opposed side walls and said bottom wall and being of an effective height less than the height of said opposed side walls, said transversely extending wall thereby defining a wier to thereby limit and define a maximum level of water within said first trough, said transversely extending wall being so located as to be generally between an inlet of said first trough communicating with said first water conduit means and an outlet of said first trough means communicating with said second water conduit means.

3. A hot water heating and humidity control system according to claim 2, including water absorbing means situated in and carried by said first trough, said water absorbing means being so positioned as to be totally peripherally confined between said inlet of said first trough and said transversely extending wall.

* * * * *